US008302165B2

(12) United States Patent
Bhai et al.

(10) Patent No.: US 8,302,165 B2
(45) Date of Patent: Oct. 30, 2012

(54) ESTABLISHING TRUST RELATIONSHIPS BETWEEN COMPUTER SYSTEMS

(75) Inventors: Siddharth Bhai, Redmond, WA (US); Zhe (Jessie) Li, Sammamish, WA (US); William S. Jack, III, Panama (PA); Christopher W. McCarron, Hartford, CT (US); James J. Simmons, Bothell, WA (US); Qi Cao, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 285 days.

(21) Appl. No.: 12/611,822

(22) Filed: Nov. 3, 2009

(65) Prior Publication Data

US 2011/0107401 A1   May 5, 2011

(51) Int. Cl.
*G06F 7/04* (2006.01)
(52) U.S. Cl. .......................................................... 726/4
(58) Field of Classification Search .................. None
See application file for complete search history.

(56) References Cited

U.S. PATENT DOCUMENTS

| | | |
|---|---|---|
| 2004/0039672 A1 | 2/2004 | Zivic et al. |
| 2006/0031510 A1 | 2/2006 | Beck et al. |
| 2007/0180495 A1 | 8/2007 | Hardjono et al. |
| 2008/0005290 A1* | 1/2008 | Nykanen et al. .............. 709/222 |
| 2008/0016195 A1 | 1/2008 | Tulshibagwale et al. |

OTHER PUBLICATIONS

Pirzada, et al., "Dependable Dynamic Source Routing without a Trusted Third Party.", Retrieved at <<http://www.acs.org.au/documents/public/crpit/CRPITV38Pirzada.pdf>>, This paper appeared at the 28th Australasian Computer Science Conference, 2005, pp. 7.
"Private Clouds and Portable User Experiences.", Retrieved at <<http://chucksblog.emc.com/chucks_blog/2009/06/private-clouds-and-portable-user-experiences.html>>, Jun. 10, 2009, pp. 4.
Esquivel, et al., "Router Level Spam Filtering Using TCP Fingerprints: Architecture and Measurement Based Evaluation.", Retrieved at <<http://pages.cs.wisc.edu/~akella/papers/ceas2009submissionFINAL2.pdf>>, CEAS 2009—Sixth Conference on Email and Anti-Spam, Jul. 16-17, 2009, pp. 10.
Parno, Bryan, "Bootstrapping Trust in a "Trusted" Platform.", Retrieved at <<https://www.usenix.org/events/hotsec08/tech/full_papers/parno/parno.pdf>>, Oct. 13, 2009, pp. 6.
Zhao, et al., "Towards Protecting Sensitive Files in a Compromised System.", Retrieved at <<http://ieeeia.org/sisw/2005/PreProceedings/03.pdf>>, Oct. 13, 2009, pp. 8.

* cited by examiner

*Primary Examiner* — Brandon Hoffman
(74) *Attorney, Agent, or Firm* — Boswell IP Law; J. Mason Boswell

(57) ABSTRACT

An offline trust system establishes a trust relationship between a trust authority computer system and a target computer system without relying on an active network connection between the computer systems. The offline trust system separates the trust establishment operation into a provisioning phase and a configuration phase. The provisioning phase can be performed entirely on the trust authority, while the configuration phase can be performed entirely on the target computer system requesting trust. The two phases can be performed at different times and do not assume any connection between the two computer systems. An administrator may perform the provisioning phase for many target computer systems at the same time. Thus, the offline trust system provides a way to establish trust between computer systems that is more reliable and less prone to failure.

20 Claims, 3 Drawing Sheets

ESTABLISHING TRUST RELATIONSHIPS BETWEEN COMPUTER SYSTEMS

BACKGROUND

Computer systems often have various roles and relationships. For example, one computer system may operate as an email server, a web server, or a domain controller, while another computer system may operate as a client. Some computer systems may have authority to perform actions, such as authenticating other computer systems, not granted to others. One type of relationship is a trust relationship, in which a trustee establishes that a particular computer system is trusted to perform one or more actions.

One type of trust relationship is established between a computer system acting in the role of a domain controller and one or more computer systems that are members of a domain. Computer systems join the domain by performing a domain join action that typically involves presenting a set of credentials (e.g., a username and password) to the domain controller, waiting for the domain controller to validate the credentials, and providing information (e.g., keys or other information) that allows the computer system to act as a member of the domain. In a Microsoft Windows environment, a domain join may involve saving state changes to Active Directory Domain Services and saving state changes on the computer system that is joining the domain.

A common point of failure in domain join and other trust establishing operations is that each computer system involved in the operation is expected to maintain uninterrupted network connectivity during the entire operation, which may involve sending and receiving many packets back and forth between the computer systems. Although the probability of a single domain join action failing due to an interruption in connectivity is generally low, the probability increases dramatically in common server provisioning scenarios. For example, an organization might want to deploy many physical or virtual machines in a data center over a short period. The extra burden on the domain controller or other trust authority may cause slow responses to some target computer systems and failures of the trust operation. Even if only 5% of the operations fail, the administrative burden to track down which target computer systems successfully established a trust relationship and which did not can be unacceptably high.

Data centers commonly have a provisioning server that configures a disk image and then sends that image to be deployed on a target production computer. An administrator sets up the production computer, joins the computer to the domain, and restarts the computer. If there are any problems associated with the domain join, such as network connectivity problems or problems that are associated with dependent servers that are offline, the administrator has to diagnose and resolve the problems at that time.

SUMMARY

An offline trust system is described herein that establishes a trust relationship between a trust authority computer system and a target computer system without relying on an active network connection between the computer systems. The offline trust system separates the trust establishment operation into a provisioning phase and a configuration phase. The provisioning phase can be performed entirely on the trust authority, while the configuration phase can be performed entirely on the target computer system requesting trust. In addition, the two phases can be performed at different times and do not assume any connection between the two computer systems. An administrator may perform the provisioning phase for many target computer systems at the same time, such as to provision servers for a data center. Thus, the offline trust system provides a way to establish trust between computer systems that is more reliable and less prone to failure, even when provisioning many target computer systems in a short period.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

An offline trust system is described herein that establishes a trust relationship between a trust authority computer system and a target computer system without relying on an active network connection between the computer systems. The offline trust system separates the trust establishment operation into a provisioning phase and a configuration phase. The provisioning phase can be performed entirely on the trust authority, such as a domain controller, while the configuration phase can be performed entirely on the target computer system requesting trust. In addition, the two phases can be performed at different times and do not assume any connection between the two computer systems. The provisioning phase involves presenting a set of credentials to the trust authority along with a request to establish a trust relationship. The trust authority stores the output of the provisioning phase into a data blob containing all of the information that the target computer system will use to complete the trust relationship. The provisioning phase completes all of the state changes and storage of new state expected by the trust authority to establish a trust relationship. For example, in a Microsoft Windows environment, a domain controller may modify Active Directory with information about a new target computer system joined to the domain, even before the target computer system has ever communicated with the domain controller. An administrator may perform the provisioning phase for many target computer systems at the same time, such as to provision servers for a data center.

The configuration phase begins by receiving the data blob created during the provisioning phase. The target computer system may receive the data blob through a wide variety of mechanisms, including over a network, by manual transfer (e.g., storage to a USB drive that is later inserted in the target computer system), or any other method. Notably, even when network communication is used to convey the contents of the data blob, the success of the trust operation is decoupled from the quality of the network connection. If the blob cannot be successfully transferred on the first attempt, it can simply be retransmitted later, as the provisioning phase has already been completed. The configuration phase stores information from the data blob on the target computer system and modifies any state information related to establishing the trust relationship. For example, the operation may store cryptographic information, such as keys or Kerberos tickets, provided in the data blob by the trust authority. Thus, the offline trust system provides a way to establish trust between computer systems that is more reliable and less prone to failure, even when provisioning many target computer systems in a short period.

Figure 1:
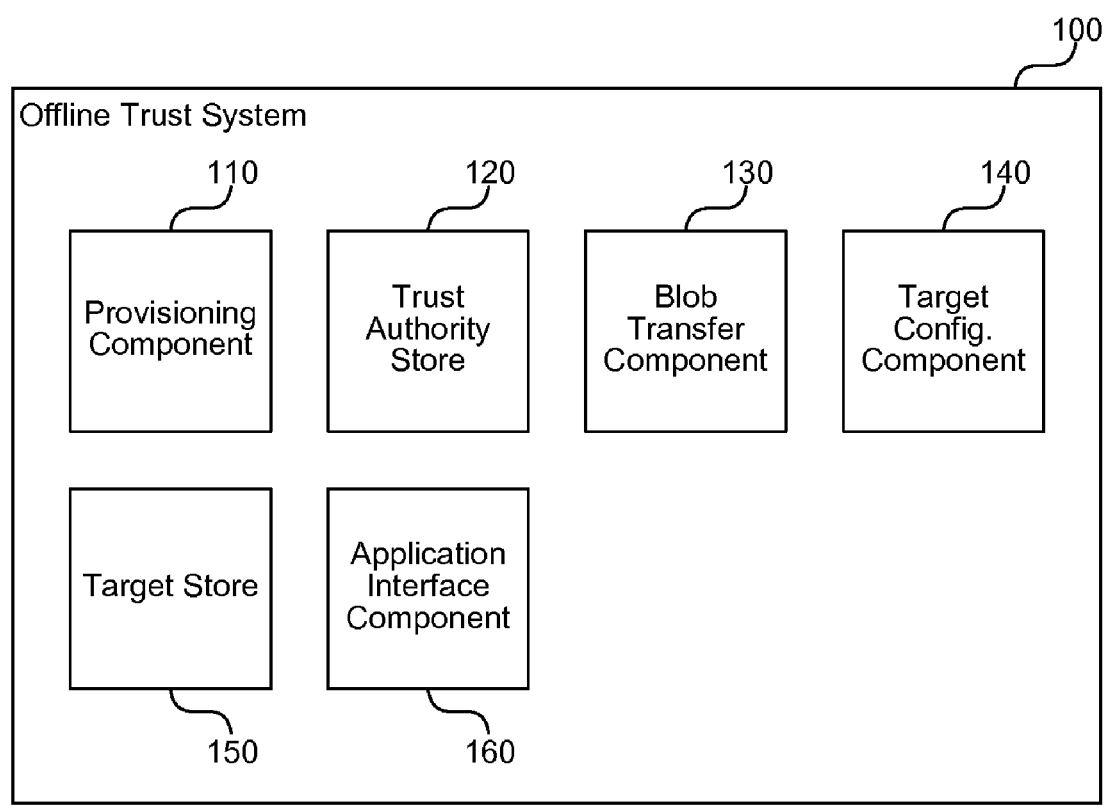
FIG. 1 is a block diagram that illustrates components of the offline trust system, in one embodiment.

FIG. 1 is a block diagram that illustrates components of the offline trust system, in one embodiment. The system 100 includes a provisioning component 110, a trust authority store 120, a blob transfer component 130, a target configuration component 140, a target store 150, and an application interface component 160. Each of these components is described in further detail herein.

The provisioning component 110 performs operations on a trust authority to establish a trust relationship with a target computer system. The provisioning component 110 may receive credentials related to the target system, create a machine account for the target system, stores information about the target system and credentials in the trust authority store 120, and creates a data blob for communication with the target system so that the target system can later perform configuration steps to complete the trust relationship. The provisioning component 110 can include a standalone component or a library invoked by one or more applications to perform provisioning steps. Notably, the provisioning component 110 can establish a trust relationship with the target computer system without active network communication with the target computer system. Because all of the steps can occur on a single trust authority computer system, the provisioning operation is less prone to interruption by glitches, such as network errors.

The trust authority store 120 stores information about a trust authority and relationships with one or more target computer systems. For example, the trust authority store 120 in a Microsoft Windows environment may include a database for storing Active Directory information, including machine accounts and passwords for one or more target computer systems joined to a domain. The trust authority store 120 may also include other information, such as a time that each relationship was created, when the relationship expires, whether the target computer system has made initial contact with the trust authority, and so forth. The trust authority can use the additional information to make decisions, such as whether to allow a particular target computer system to access domain resources.

The blob transfer component 130 communicates the data blob produced by the provisioning component 110 to a target computer system. Although described here as a component, the blob may be transferred by a wide variety of mechanisms including manual transfer by an administrator that does not involve software or network communication. For example, an administrator could burn the data blob to a CD or place the blob on a portable disk drive and later connect the drive or insert the CD in a target computer system. As another example, the blob may be transferred over a network (e.g., stored on a provisioning server), but without the risk that the provisioning operation will fail due to network errors. Because all of the steps needed to complete the provisioning operation have occurred on the trust authority, the operation is not dependent on the quality of the network connection. Although the target system will eventually need to receive the data blob to complete the trust relationship, the trust authority and target computer system operations for completing the operation are decoupled and can take place at substantially different times. Thus, even if a network connection is not available, the blob transfer component 130 can transfer the data blob to the target computer system later when network connectivity is available without negative impact on establishment of the trust relationship.

The target configuration component 140 receives the data blob created by the provisioning component 110 and performs operations on a target computer system to complete the trust relationship with the trust authority. For example, the target configuration component 140 may receive the data blob, extract credential or other information from the data blob, store the credential information in a target store 150, and then notify the target computer system that the trust relationship is ready for use, such as to access network resources. The target configuration component 140 may operate as a software module on the target computer system or over a network from a provisioning service. In a data center, for example, new target computer systems may start up, perform configuration steps to establish membership in a domain, and then access domain resources upon the first startup without ever having previously communicated with a domain controller or other trust authority.

The target store 150 is a data store that stores information associated with the target computer system related to the trust relationship. For example, the target store 150 may include authentication data provided by the trust authority and used by the target computer system to access trusted resources. In some embodiments, the authentication data may include a machine account name and password. Those of ordinary skill in the art will note that other kinds of authentication data can be provided by a trust authority. The target store 150 may include a file, database, cloud based service, system registry, or any other suitable data storage system capable of storing trust relationship information.

The application interface component 160 is an optional component provided by the system to expose access to the offline trust system 100 to applications. For example, the system may expose an application-programming interface (API) to applications for the provisioning steps described herein and another API for the target configuration steps described herein. Applications can provide information about a new target computer system to the provisioning API to establish a trust relationship between a trust authority and the target computer system. The API may respond with the data blob described herein, which the application can communicate to another application running elsewhere to configure the target computer system. In some embodiments, the application that receives the data blob may operate on a target OS image related to a virtual machine (e.g., by calling a configuration API), and may perform configuration of the trust relationship by extracting elements from the data blob and storing them in the OS image, even without the target computer system running.

The computing device on which the offline trust system is implemented may include a central processing unit, memory, input devices (e.g., keyboard and pointing devices), output devices (e.g., display devices), and storage devices (e.g., disk drives or other non-volatile storage media). The memory and storage devices are computer-readable storage media that may be encoded with computer-executable instructions (e.g., software) that implement or enable the system. In addition, the data structures and message structures may be stored or transmitted via a data transmission medium, such as a signal on a communication link. Various communication links may be used, such as the Internet, a local area network, a wide area network, a point-to-point dial-up connection, a cell phone network, and so on.

Embodiments of the system may be implemented in various operating environments that include personal computers, server computers, handheld or laptop devices, multiprocessor systems, microprocessor-based systems, programmable consumer electronics, digital cameras, network PCs, minicomputers, mainframe computers, distributed computing environments that include any of the above systems or devices, and so on. The computer systems may be cell phones, personal digital assistants, smart phones, personal computers, programmable consumer electronics, digital cameras, and so on.

The system may be described in the general context of computer-executable instructions, such as program modules, executed by one or more computers or other devices. Generally, program modules include routines, programs, objects, components, data structures, and so on that perform particular tasks or implement particular abstract data types. Typically, the functionality of the program modules may be combined or distributed as desired in various embodiments.

The data blob described herein may include a variety of information for establishing a trust relationship. In one embodiment, the data blob includes a machine name and machine password identifying a target computer system joined to a domain. Following are data structures for one example implementation of the data blob. Those of ordinary skill in the art will recognize that many alternative and similarly functional representations are possible.

```
// Blob formats
#define ODJ_WIN7_FORMAT 1
typedef struct _ODJ_WIN7BLOB {
    LPCWSTR lpDomain;
    LPCWSTR lpMachineName;
    LPCWSTR lpMachinePassword;
    POLICY_DNS_DOMAIN_INFO DnsDomainInfo;
    // Information on the DC used in the join
    DOMAIN_CONTROLLER_INFO DcInfo;
    DWORD fJoinOptions;
} ODJ_WIN7BLOB;
// Individual ODJ blob
typedef struct _OBJ_BLOB {
    ULONG ulODJFormat;
    ULONG ulcBlob;
    // e.g., contains a serialized instance of ODJ_WIN7BLOB
    [sizeis(ulcBlob)] PBYTE pBlob;
} ODJ_BLOB, *PODJ_BLOB;
// Master blob that can contain multiple blob formats
typedef struct _ODJ_PROVISION_DATA {
    ULONG ulVersion; // 1 for Win7;
    ULONG ulcBlobs;
    [sizeis(ulcBlobs)] PODJ_BLOB pBlobs; // array of blobs
} ODJ_PROVISION_DATA, *PODJ_PROVISION_DATA;
```

Figure 2:
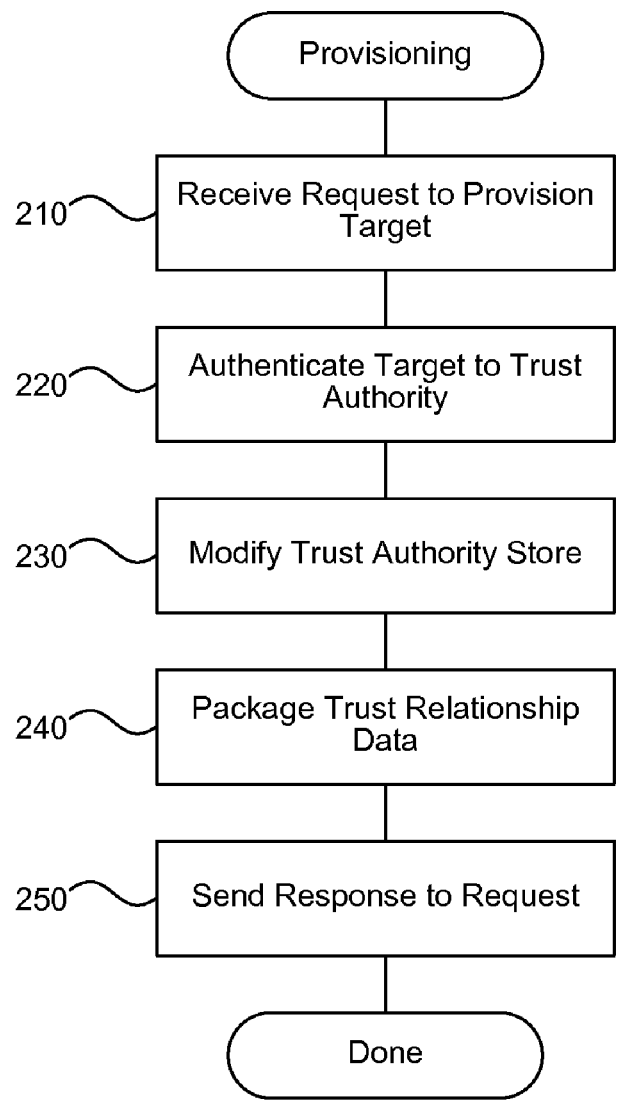
FIG. 2 is a flow diagram that illustrates processing of the provisioning component to establish trust with a target computer system, in one embodiment.

FIG. 2 is a flow diagram that illustrates processing of the provisioning component to establish trust with a target computer system, in one embodiment. Beginning in block 210, the component receives a request to provision a target computer system. The request may include information, such as credentials related to the target computer system. For example, the request may include a machine name associated with the target computer system and a password, and/or a username and password of a user with authority to perform the provisioning operation. The request may come from an application, administrator, or other source.

Continuing in block 220, the component authenticates the received request with a trust authority to ensure that the requestor has sufficient permission to perform the provisioning operation. For example, the component may compare a received username and password with stored information about a particular user or target computer system to determine whether the user or target system has access to perform the provisioning operation. Continuing in block 230, the component modifies a trust authority store to store information about a new trust relationship between the trust authority and the target computer system. For example, the component may modify a Microsoft Windows Active Directory database to include information, such as credentials, related to the target computer system. The information may also include additional properties, such as a time of formation of the trust relationship, a source of or other auditing information about the provisioning request, an expiration time of the trust relationship, and so forth.

Continuing in block 240, the component packages data related to the trust relationship into a data blob for communication to a target configuration component. The data blob may be an opaque binary representation provided to an application that is later communicated to the target computer system in a manner determined by the application. The data blob may include cryptographic information, version information, metadata, and other properties useful for establishing a trust relationship at a target computer system in a decoupled manner (e.g., without actively communicating with the trust authority). Continuing in block 250, the component sends a response to the received request that includes the packaged trust relationship data. For example, if an application invokes the component to provision a new target computer system, then the application receives a response that includes the data blob. After block 250, these steps conclude.

Figure 3:
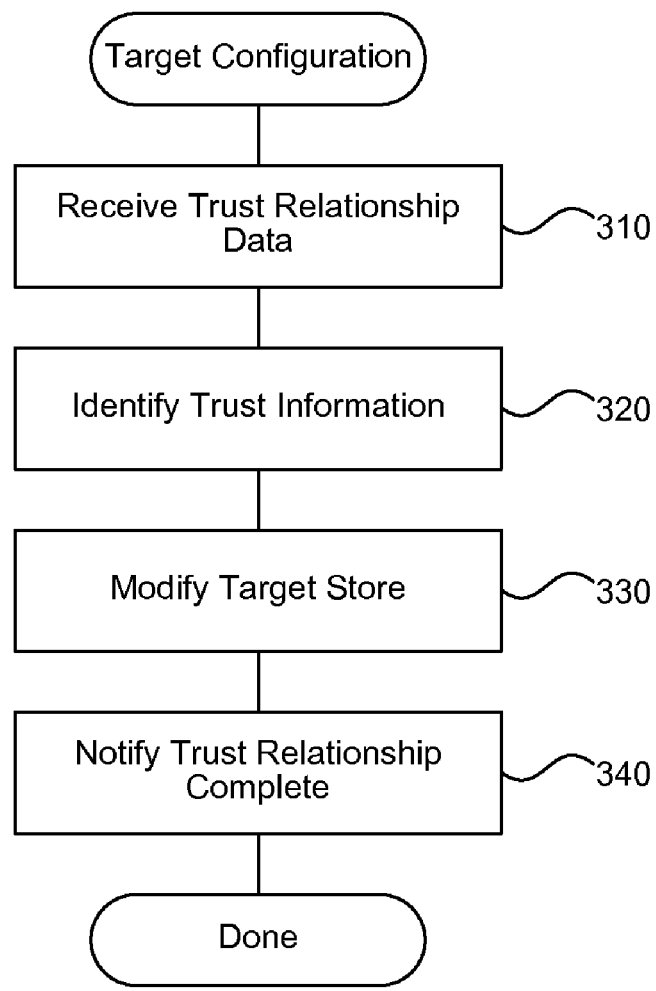
FIG. 3 is a flow diagram that illustrates processing of the target configuration component to configure a target computer system, in one embodiment.

FIG. 3 is a flow diagram that illustrates processing of the target configuration component to configure a target computer system, in one embodiment. Beginning in block 310, the component receives at a target computer system a trust relationship data blob produced by a trust authority in response to an earlier provisioning operation. The component may receive the data blob in a variety of ways, such as in an unattended setup answer file. The component does not, however, need an active network connection with the trust authority to establish a trust relationship. Continuing in block 320, the component identifies trust information in the received trust relationship data blob for establishing a trust relationship with the target computer system. For example, the component may extract credential information (e.g., a machine name and password) from the trust relationship data blob).

Continuing in block 330, the component modifies a data store associated with the target computer system to establish the trust relationship. For example, the component may modify an operating system registry or configuration database that stores information about one or more trust relationships of which the target computer system is a member. Continuing in block 340, the component provides notification that the trust relationship has been established on the target computer system. For example, if an application invoked the component to configure the target computer system, then the component provides the notification to the application that the trust relationship has been established. After block 340, these steps conclude.

In some embodiments, the offline trust system supports provisioning of target computer systems in batches. For example, an administrator may want to create machine accounts for an entire data center over a short period. Trust relationship provisioning in remote trust authorities is vulnerable to occasional network connectivity errors. By decoupling the provisioning operation from the device configuration operation, the offline trust system enables more reliable, scalable solutions where many trust relationships are provisioned for later association with many target computer systems. Trust relationship configuration on the device is insulated from connectivity related errors that might occur while provisioning.

In some embodiments, the offline trust system establishes a trust relationship for a target machine that is not even running. For example, a virtual machine often stores data in a well-known format, such as the VHD files used by Microsoft virtualization technologies (e.g., Microsoft Virtual PC). The configuration component can access stored virtual machine data, identify the location where trust information is typically stored (e.g., a registry hive or other data file), and modify the location to include information from the trust relationship data blob provisioned earlier at a trust authority. When the target machine is later run, it is already part of the trust relationship or can complete any additional steps to complete the relationship and then operate using the relationship normally. As an example, an administrator could configure many virtual machines in a data center to be joined to a particular domain without any of the virtual machines ever having run or communicated with a domain controller. This substantially simplifies provisioning of new hardware in data centers and other environments.

The offline trust system also eliminates restarting the target computer system when the trust relationship is configured on the target system. For example, an organization might want to deploy many virtual machines in a datacenter. The offline trust system makes it possible for the virtual machines to be joined to the domain when they initially start after the installation of the operating system. No additional restart is required to complete the domain join. This can significantly reduce the overall time that is required for wide-scale virtual-machine deployments. Operating system installations often provide answer files and other facilities for injecting information into the operating system setup process. The trust relationship data blob can be provided in such an answer file or other facility to provide the target system with information during setup for establishing the trust relationship.

In some embodiments, the offline trust system provides a command-line interface (CLI) for establishing offline trust relationships. The CLI allows an administrator to perform provisioning or configuration steps from a command prompt, and to use command prompt support for scripting and batch files to enable batch provisioning and configuration.

In some embodiments, the offline trust system is provided as one or more APIs provided as operating system components that an application can invoke to perform the functions described herein. For example, an operating system may provide a Managed Device Trust (MDT) component that exposes an MDT Provision Service and an MDT Configuration Service. The managed device identity is established in phases by one or more higher layer applications using MDT services. First, the device trust relationship is provisioned in a centralized authority using an authenticated and encrypted protocol (e.g., LDAP). The centralized authority may be local or remote. Metadata is collected about the newly provisioned managed device trust relationship and returned to the higher layer application in an abstract opaque form.

Next, the higher layer application determines when and where to access the target device's persisted system state. To configure the trust relationship on the managed device the application submits the location of the device's system state and trust metadata to the MDT component. The MDT component then extracts data elements from the metadata and applies them to the device's persisted system state. The device itself need not be on or in a running state, provided that it's persisted system state is accessible to the MDT component. At this point, the trust relationship is provisioned and configured on the device. The application may use MDT services to provision and configure trust relationships singularly or in batches.

The offline trust system decouples the representation of the trust relationship in the trust authority and on the target computer system using intermediary metadata. The higher layer application may be agnostic to a particular trust authority's representation of a trust relationship and similarly a particular target computer system's representation of the metadata. So long as the application conveys the data received from the provisioning stage at the trust authority to the target computer system for the configuration phase, the trust relationship can be established.

In some embodiments, the offline trust system stores a time to live (or lifetime) in the trust relationship data conveyed from the trust authority to the target computer system. The configuration component configuring a trust relationship on a target computer system may detect the case of metadata that is stale and likewise a trust authority can prevent target computer systems from using a relationship that is stale. The system can detect the first usage of a target computer system and revoke a trust relationship whose lifetime has expired.

In some embodiments, the offline trust system stores versioning information in the trust relationship data. The contents of the trust relationship data may change over time or from trust authority to trust authority. The trust relationship data blob is constructed with sufficient internal versioning information that, for any supported central authority, any version of the system can provision a trust relationship and package metadata that any other version of the system can interpret for the purposes of configuring the relationship on the target computer system.

In some embodiments, the offline trust system creates trust relationship data that associates a single target computer system with multiple trust authorities. For example, a user of a system may want to join a domain associated with his work (e.g., an Active Directory-based domain), and establish another trust relationship for personal use (e.g., a live.com account). The trust relationship data may contain multiple trust relationship types represented in multiple trust authorities and may be associated with the single target computer system.

In some embodiments, the offline trust system creates trust relationship data that includes cached information for allowing a target computer system to login to a domain offline. Today, when a corporate user with a laptop joined to a domain uses the laptop without connectivity to the corporate domain, the laptop contains cached credential information that allows the user to logon and use the laptop even though the domain is not available. The offline trust system can include similar credential information in the trust relationship data blob, so that during configuration not only is the trust relationship established, but the target system also receives any information necessary to logon and use the completed trust relationship. As one example, a corporate user could access a web page to provision a new laptop, receive a data blob at a home computer, then configure the new laptop at home and login to the laptop as if it were already joined to a corporate domain, even without the laptop ever having been taken to work. When the user is later connected to the corporate network, the user can logon to the domain in an online manner and use all domain resources as if a traditional online domain join had been performed.

From the foregoing, it will be appreciated that specific embodiments of the offline trust system have been described herein for purposes of illustration, but that various modifications may be made without deviating from the spirit and scope of the invention. For example, although domain joins have been used as an example of establishing a trust relationship, there are many other types of trust relationships to which the system can be applied. For example, cell phone providers sometimes perform a provisioning process on new cell phones before allowing them to use some features of a cellular network. Accordingly, the invention is not limited except as by the appended claims.

We claim:

1. A computer-implemented method for establishing a trust relationship between a trust authority and a target computer system, the method comprising:
   receiving a request to provision the target computer system;
   separating work in response to the request into a provisioning phase and a configuration phase, wherein the provisioning phase can be performed entirely on the trust authority and the configuration phase can be performed entirely on the target computer system requesting trust so that the two phases can be performed at different times and do not assume any connection between the trust authority and the target computer system;
   during the provisioning phase,
      verifying the received request with the trust authority to ensure that the requestor has sufficient permission to establish the trust relationship;
      modifying a trust authority store to store information about a new trust relationship between the trust authority and the target computer system;
      packaging data related to the trust relationship into a data blob for communication to a target configuration component, wherein the data blob contains information for configuring the trust relationship on the target computer system without additional communication with the trust authority; and
      sending a response to the received request that includes the packaged trust relationship data for communication to the target computer system for completion of the configuration phase,
   wherein the preceding steps are performed by at least one computer system.

2. The method of claim 1 wherein receiving the request comprises receiving credential information related to the target computer system.

3. The method of claim 1 wherein receiving the request comprises receiving the request from an application that invokes the method within a separate component.

4. The method of claim 1 wherein authenticating the received request comprises comparing credentials received with the request with credentials stored by the trust authority.

5. The method of claim 1 wherein modifying the trust authority store comprises modifying a Microsoft Windows Active Directory database to include credential information related to the target computer system.

6. The method of claim 1 wherein modifying the trust authority store comprises storing an expiration time of the new trust relationship, after which attempts by the target computer system to act as a member of the trust relationship will be denied.

7. The method of claim 1 wherein modifying the trust authority store comprises storing audit information describing a source of the request.

8. The method of claim 1 wherein receiving a request comprises receiving a batch request for creating trust relationships between the trust authority and multiple target computer systems.

9. The method of claim 1 wherein packaging data comprises creating an opaque binary representation provided to an application that is later communicated to the target computer system in a manner determined by the application.

10. The method of claim 1 wherein packaging data comprises adding version information to the data blob.

11. A computer system for establishing a trust relationship between a trust authority and a target computer system, the system comprising:
   a processor and memory configured to execute software instructions;
   a provisioning component configured to perform one or more operations on a trust authority computer system to establish a trust relationship with the target computer system, wherein establishing a trust relationship with the target computer system is divided into a provisioning phase and a configuration phase, wherein the provisioning phase can be performed by the provisioning component entirely on the trust authority computer system and the configuration phase can be performed entirely on the target computer system requesting trust so that the two phases can be performed at different times and do not assume any connection between the trust authority computer system and the target computer system;
   a trust authority store configured to store information about a trust authority and relationship with one or more target computer systems;
   a target configuration component configured to receive a data blob created by the provisioning component and to complete the configuration phase by performing one or more operations on the target computer system to complete the trust relationship with the trust authority, wherein the target configuration component can establish a trust relationship using the data blob without active network communication with the trust authority; and
   a target store configured to store information associated with the target computer system related to the trust relationship.

12. The system of claim 11 wherein the provisioning component is further configured to receive credentials related to the target computer system, create a machine account for the target system, store information about the target system and credentials in the trust authority store, and create a data blob for communication with the target system so that the target system can later perform configuration steps to complete the trust relationship.

13. The system of claim 11 wherein the trust authority store is further configured to store additional information to determine whether to allow a particular target computer system to access trusted resources.

14. The system of claim 11 wherein the target configuration component is further configured to receive the data blob, extract credential information from the data blob, store the credential information in the target store, and notify the target computer system that the trust relationship is ready for use.

15. The system of claim 11 wherein the target configuration component is further configured to establish the trust relationship by modifying stored data associated with a target computer system while the target computer system is not running.

16. The system of claim 11 wherein the target store is further configured to store trust data provided by the trust authority and used by the target computer system to access trusted resources.

17. The system of claim 11 further comprising an application interface component configured to expose access to the provisioning component and target configuration component to one or more applications through one or more application programming interfaces (APIs).

18. A computer-readable storage device comprising instructions for controlling a computer system to configure a target computer system to establish a trust relationship with a trust authority, wherein the instructions, when executed, cause a processor to perform actions comprising:

during a configuration phase of an operation to establish the trust relationship, wherein the operation is divided into a provisioning phase and a configuration phase, wherein the provisioning phase can be performed entirely on the trust authority and the configuration phase can be performed entirely on the target computer system requesting trust so that the two phases can be performed at different times and do not assume any connection between the trust authority and the target computer system, receiving at the target computer system a trust relationship data blob produced by the trust authority in response to an earlier provisioning operation, wherein the target computer system can receive the data blob without an active network connection with the trust authority;

identifying trust information in the received trust relationship data blob for establishing the trust relationship with the target computer system;

modifying a data store associated with the target computer system to establish the trust relationship; and providing a notification that the trust relationship has been established on the target computer system.

19. The device of claim 18 wherein modifying the data store comprises modifying an operating system configuration database that stores information about one or more trust relationships of which the target computer system is a member.

20. The device of claim 18 wherein the trust relationship data blob contains information for establishing trust relationships with multiple trust authorities.

* * * * *